(12) United States Patent
Smith

(10) Patent No.: US 7,253,422 B2
(45) Date of Patent: Aug. 7, 2007

(54) CONTAINER HAVING IRRADIATED INDICIA

(75) Inventor: Roger P. Smith, Perrysburg, OH (US)

(73) Assignee: Owens-Illinois Healthcare Packaging Inc., Perrysburg, OH (US)

( * ) Notice: Subject to any disclaimer, the term of this patent is extended or adjusted under 35 U.S.C. 154(b) by 694 days.

(21) Appl. No.: 10/793,523

(22) Filed: Mar. 3, 2004

(65) Prior Publication Data

US 2005/0194280 A1 Sep. 8, 2005

(51) Int. Cl.
*G06K 7/10* (2006.01)

(52) U.S. Cl. .................................. 250/492.1

(58) Field of Classification Search ............. 250/492.1
See application file for complete search history.

(56) References Cited

U.S. PATENT DOCUMENTS

| | | |
|---|---|---|
| 4,769,310 A | 9/1988 | Gugger et al. |
| 4,919,855 A | 4/1990 | Thomas et al. |
| 5,084,623 A * | 1/1992 | Lewis et al. ............. 250/474.1 |
| 5,135,569 A | 8/1992 | Mathias |
| 5,206,496 A | 4/1993 | Clement et al. |
| 5,461,136 A | 10/1995 | Krutak et al. |
| 2003/0015509 A1 | 1/2003 | Gaissinsky et al. |

FOREIGN PATENT DOCUMENTS

| | | |
|---|---|---|
| GB | 2220648 | 1/1990 |
| WO | WO 00/44508 | 8/2000 |

\* cited by examiner

*Primary Examiner*—Kiet T. Nguyen

(57) ABSTRACT

A method of making an identifiable container by providing a molded plastic container that includes at least one layer of material blended with an additive. A mask is provided having a radiation aperture in the form of identifiable indicia, and radiation is directed through the aperture of the mask and onto the container such that the radiation is absorbed by the additive, thereby causing the additive to visibly respond in the form of the identifiable indicia.

11 Claims, 1 Drawing Sheet

CONTAINER HAVING IRRADIATED INDICIA

The present invention is directed to hollow plastic containers, and more particularly to a hollow plastic container having irradiated indicia as an identifiable security measure to combat use of counterfeit containers.

BACKGROUND AND SUMMARY OF THE INVENTION

In the production of hollow plastic containers, it is common to injection mold a preform and then blow mold the preform to achieve the final shape of a container. The body portion of the container may be of monolayer construction, or may be of multilayer construction in which one or more intermediate layers form a barrier against gas transmission through the container. Such multilayer blow molded containers are often used for medical-type products such as pharmaceuticals. However, pharmaceuticals are sometimes counterfeited and packaged in counterfeit containers that look identical to genuine containers used to market genuine pharmaceuticals. Accordingly, such counterfeit containers are used to deceive pharmacists and consumers into buying counterfeit pharmaceuticals.

A method of making an identifiable container in accordance with one aspect of the present invention includes providing a molded plastic container having a wall that includes at least one layer of material blended with an additive, providing a mask having a radiation aperture in the form of identifiable indicia, and directing radiation through the radiation aperture of the mask and onto the container such that the radiation is absorbed by the additive, thereby causing the additive to visibly respond in the form of the identifiable indicia. The container wall can be of monolayer construction, or of multilayer construction in which the additive is provided in at least one of the layers, preferably a barrier layer.

In accordance with a second aspect of the invention, there is provided a container that includes a plastic wall having at least one layer of material blended with an additive. The layer of material has a portion that is made visible by absorption of radiation, and that is in the form of identifiable indicia.

BRIEF DESCRIPTION OF THE DRAWINGS

The invention, together with additional objects, features, advantages and aspects thereof, will be best understood from the following description, the appended claims and the accompanying drawings, in which:

DETAILED DESCRIPTION OF PREFERRED EMBODIMENTS

Figure 1A:
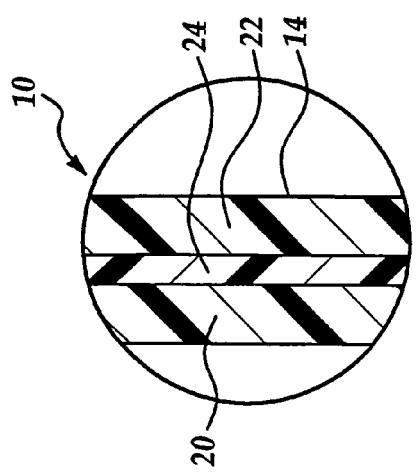
FIG. 1A illustrates an enlarged cross-sectional view of a sidewall of the container of FIG. 1 taken from circle 1A thereof.
Figure 1B:
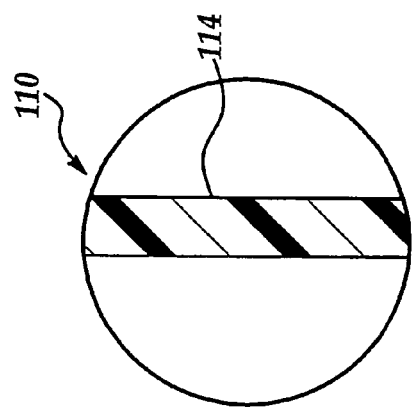
FIG. 1B illustrates an enlarged cross-sectional view of a sidewall of a container according to an alternative embodiment of the present invention.
Figure 1:
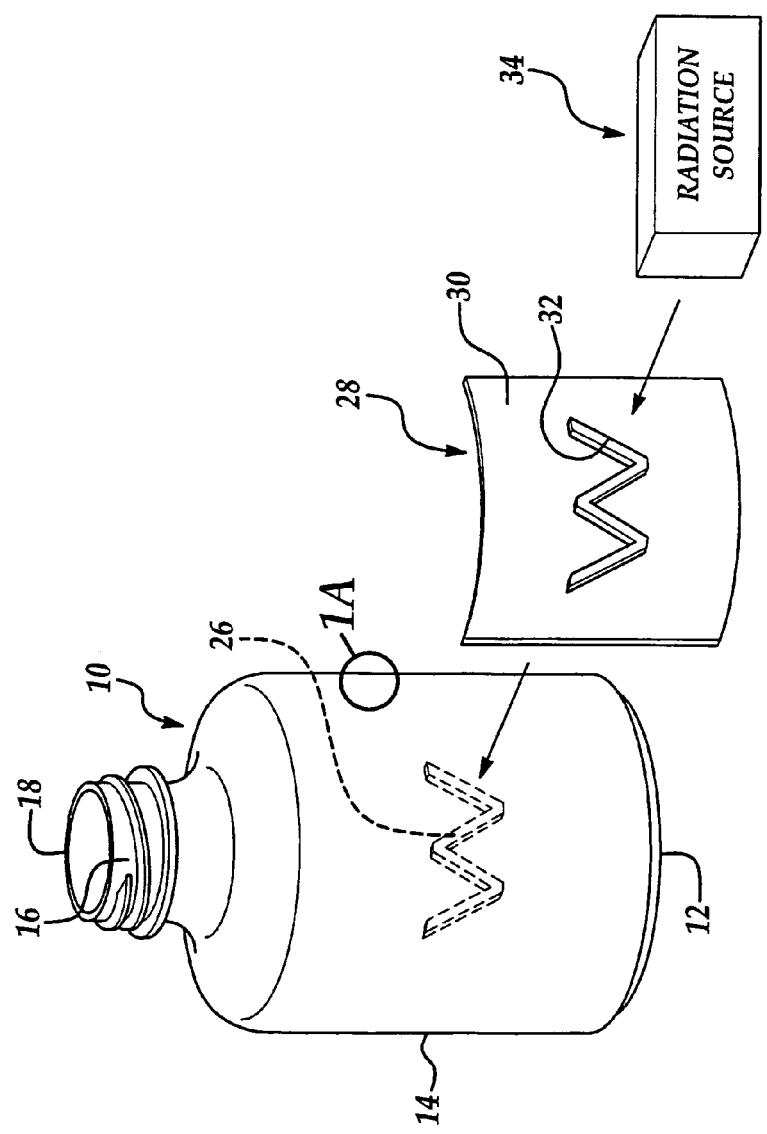
FIG. 1 illustrates a perspective view of a container of an embodiment of the present invention, as well as a mask and a radiation source that are used in accordance with an embodiment of a method of the present invention.

In general, FIG. 1 illustrates a container 10 in accordance with an embodiment of the present invention, as well as exemplary apparatus that is used to carry out a method of the present invention for producing the article. The container may be substantially similar to that disclosed in U.S. Pat. No. 4,954,376, except for the inventive features of the present invention, which will be described in detail below. The container may also be produced by an apparatus and method that are respectively disclosed in U.S. Pat. Nos. 4,710,118 and 4,609,516. Accordingly, U.S. Pat. Nos. 4,710,118, 4,609,516, and 4,954,376 are all incorporated by reference herein.

In specific reference to FIG. 1, the container 10 includes a closed bottom end 12, a sidewall 14 extending from said closed bottom end 12, and a neck finish portion 16 terminating the sidewall 14 and having an open end 18 substantially opposite of the closed bottom end 12. The container 10 may be produced by any known method of forming containers, such as by extrusion blow molding, but preferably is produced by blow forming a sequentially injection molded preform.

FIG. 1A depicts an enlarged cross-sectional portion of the container 11 of FIG. 1. Here, it can be seen that the sidewall 14 is multilayered, preferably from multiple resins, and includes inside and outside layers 20, 22 that are composed of a matrix resin, and an intermediate layer 24 that preferably is composed of a barrier resin. The preferred thickness of the intermediate layer 24 is approximately 40% of the entire thickness of the sidewall 14, while the inside and outside layers 20, 22 are each approximately 30% of the entire thickness of the sidewall 14. Additional or alternative intermediate layers may be provided, such as a layer of post consumer resin. It is contemplated that the multilayered sidewall 14 could be composed of more or fewer layers without departing from the scope of the invention. In any case, the matrix resin in layers 20, 22 preferably is composed of polycarbonate or polyethylene polymer, but may be composed of any other desired container material. The barrier resin in layer 24 preferably is a nylon or ethylene vinyl alcohol (EVOH) polymer, but may be any other suitable barrier material used for containers.

FIG. 1B depicts an enlarged cross-sectional portion of a container 110 according to an alternative embodiment of the present invention. Here, the container 110 includes only one layer of resin material to define a sidewall 114—i.e., is of monolayer construction. The sidewall 114 may be composed of any desired resin material such as a matrix resin, barrier resin, or a blend thereof.

An additive is added to one of the layers of the sidewall 14 or 114 before forming the container 10 or 110, for example prior to or during injection molding the preform that is used to blow form the container 10 or 110. The additive may be blended into monolayer 114 in FIG. 1B, or into any layer (preferably barrier layer 24) in FIG. 1A. The additive is used as a unique identifier to make counterfeiting of the container 10, 110 more difficult. Preferably, the additive is a particularly discernable material under ultraviolet light, such as a fluorescent or phosphorescent material. Examples of such materials include strontium silicate phosphor, zinc sulfide, cadmium sulfide, sodium fluorescein, rhodamine and the like. However, the additive can be any material that is responsive to absorption of radiation at one wavelength to emit radiation at another wavelength for an extended time duration.

Referring again to FIG. 1, the sidewall 14 (or sidewall 114 in FIG. 1B) includes a localized irradiated portion 26, which may be of any suitable desired indicia including any geometric shape, logo, text or the like. The irradiated portion 26 is produced by masking and irradiating the container 10. A radiation-resistant mask 28 is provided having an opaque or solid portion 30 and a transparent portion or aperture 32 formed therein. For example, the mask 28 could be a lead tube into which the container 10 is inserted and through a sidewall of which an aperture is punched, cut or otherwise formed. A radiation source 34 is provided for directing radiation through the mask 28 and onto the container 10, such that radiation is absorbed by the additive in the container 10, thereby causing the additive to visibly respond in the outline or form of the aperture 32 of the mask 30. For example, if the additive is a fluorescing agent, then the radiation is absorbed by the fluorescing agent, thereby causing the fluorescing agent to fluoresce or glow in the form of the indicia 26 against the background of the rest of the container 10 which does not glow due to the masking thereof. The radiation source 34 may be a gamma radiation source for outputting gamma radiation. Absorption of the gamma radiation will cause the indicia to emit a faint glow for many weeks or months. Any type of radiation and source are contemplated by the present invention as long as they create a visible response of the additive within the barrier layer of the container 10.

Accordingly, the additive and the irradiation thereof in the form of the indicia 26 on the container 10 combine to provide a localized or discrete irradiated identifier, to thereby more uniquely identify the container 10. In other words, the present invention thus provides an overt security feature in the form of a kind of "watermark" in the sidewall 14 of the container 10. A "genuine" container 10 of the present invention bearing such a watermark can be more readily distinguished from a non-genuine container not bearing such a watermark. The watermarked container is difficult for counterfeiters to reproduce and indicates the authenticity of the product packaged therein. Thus, by using the present invention, pharmacists and consumers are relatively more protected against the intrusion of counterfeit pharmaceuticals into the marketplace.

There have thus been described an article and method of producing the article that fully satisfy all of the objects and aims previously set forth. The present invention has been disclosed in conjunction with presently preferred embodiments thereof, and a number of modifications and variations have been discussed. Other modifications and variations will readily suggest themselves to persons of ordinary skill in the art in view of the foregoing description. For example, the invention has been disclosed in conjunction with a unique identifier in a sidewall of a container. However, the unique identifier can be produced in any location on a container, such as the closed bottom end or the finish portion without departing from the disclosure. Furthermore, the invention has been disclosed in conjunction with a container; however other implementations are contemplated such as a closure for a container. Also, the term container is defined herein as including a container preform or even a closure for a container. The term irradiate is broadly defined herein to include any process for treating or exposing something to light or other radiant energy to create a relatively more visibly marked portion compared to surrounding portions. Furthermore, the term indicia is broadly defined herein to include anything that provides a visible indication in one or more types of light. Indeed, the invention is intended to embrace all modifications and variations as fall within the spirit and broad scope of the appended claims.

The invention claimed is:

1. A method of making an identifiable container, which includes:
   (a) providing a molded plastic container that includes at least one layer of plastic material blended with a fluorescing or phosphorescing agent,
   (b) providing a mask having a radiation aperture in the form of identifiable indicia, and
   (c) directing gamma radiation through said radiation aperture of said mask and onto said container such that said radiation is absorbed by said fluorescing or phosphorescing agent to form an overt watermark in the container in the form of said indicia.

2. The method set forth in claim 1 wherein said identifiable indicia comprises a logo.

3. The method set forth in claim 1 wherein said container includes a sidewall and said identifiable indicia is formed in said sidewall.

4. A container produced by the method of claim 1.

5. The method set forth in claim 1 wherein said at least one layer of material includes at least one layer of matrix polymer and at least one layer of barrier polymer.

6. The method set forth in claim 5 wherein said at least one layer of barrier polymer includes an additive.

7. A container that includes:
   a plastic wall having at least one layer of plastic material blended with a fluorescing or phosphorescing agent,
   said at least one layer having an overt watermark that has been made visible by absorption of gamma radiation,
   said overt watermark being in the form of identifiable indicia within said wall.

8. The container set forth in claim 7 wherein said container includes a sidewall and said identifiable indicia is formed in said sidewall.

9. The container set forth in claim 7 wherein said identifiable indicia comprises a logo.

10. The container set forth in claim 7 wherein said at least one layer of material includes at least one layer of matrix polymer and at least one layer of barrier polymer.

11. The container set forth in claim 10 wherein said at least one layer of barrier polymer includes an addictive.

* * * * *